United States Patent
Sampathkumar et al.

(10) Patent No.: US 10,834,010 B2
(45) Date of Patent: Nov. 10, 2020

(54) MITIGATING PRIORITY FLOW CONTROL DEADLOCK IN STRETCH TOPOLOGIES

(71) Applicant: Cisco Technology, Inc., San Jose, CA (US)

(72) Inventors: Saravanan Sampathkumar, San Jose, CA (US); Ajay K. Modi, San Jose, CA (US); Umamaheswararao Karyampudi, Fremont, CA (US); Vikas V. Patel, Livermore, CA (US); Gautam Venkataramanan, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 16/172,659

(22) Filed: Oct. 26, 2018

(65) Prior Publication Data

US 2020/0136985 A1 Apr. 30, 2020

(51) Int. Cl.
*H04L 12/863* (2013.01)
*H04L 12/851* (2013.01)
*H04L 12/935* (2013.01)
*H04L 12/865* (2013.01)
*H04L 12/861* (2013.01)

(52) U.S. Cl.
CPC ...... *H04L 47/6205* (2013.01); *H04L 47/2433* (2013.01); *H04L 47/6215* (2013.01); *H04L 47/6275* (2013.01); *H04L 49/3018* (2013.01); *H04L 49/9036* (2013.01)

(58) Field of Classification Search
CPC .......... H04L 47/6205; H04L 47/2433; H04L 47/6215; H04L 47/6275; H04L 49/3018; H04L 49/9036; H04L 47/32; H04L 12/44
See application file for complete search history.

(56) References Cited

U.S. PATENT DOCUMENTS

| | | | |
|---|---|---|---|
| 6,859,435 B1 * | 2/2005 | Lee | H04L 47/10 370/231 |
| 8,520,522 B1 | 8/2013 | Goldman et al. | |
| 8,553,582 B1 | 10/2013 | Mizrahi et al. | |
| 9,338,019 B2 | 5/2016 | Bestler et al. | |

(Continued)

OTHER PUBLICATIONS

Cisco White Paper, "Cisco Nexus 5548P Switch Architecture," 2010, 13 pages.

*Primary Examiner* — Benjamin M Thieu
(74) *Attorney, Agent, or Firm* — Patterson + Sheridan, LLP

(57) ABSTRACT

Embodiments provide for mitigating priority flow control deadlock in stretch topologies by initializing a plurality of queues in a buffer of a leaf switch at a local cluster of a site having a plurality of clusters, wherein each queue of the plurality of queues corresponds to a respective one cluster of the plurality of clusters; receiving a pause command for no-drop traffic on the leaf switch, the pause command including an internal Class-of-Service (iCoS) identifier associated with a particular cluster of the plurality of cluster and a corresponding queue in the plurality of queues; and in response to determining, based on the iCoS identifier, that the pause command was received from a remote spine switch associated with a different cluster than the local cluster: forwarding the pause command to a local spine switch in the local cluster; and implementing the pause command on the corresponding queue in the buffer.

20 Claims, 6 Drawing Sheets

(56) References Cited

U.S. PATENT DOCUMENTS

| | | | |
|---|---|---|---|
| 10,454,839 B1* | 10/2019 | Lin | H04L 45/48 |
| 2013/0051235 A1* | 2/2013 | Song | H04L 49/351 |
| | | | 370/235 |
| 2014/0169169 A1* | 6/2014 | Almog | H04L 47/2441 |
| | | | 370/235 |
| 2014/0376373 A1* | 12/2014 | Deshpande | H04L 47/12 |
| | | | 370/235 |

* cited by examiner

MITIGATING PRIORITY FLOW CONTROL DEADLOCK IN STRETCH TOPOLOGIES

TECHNICAL FIELD

Embodiments presented in this disclosure generally relate to the control of flow control mechanisms in networks. More specifically, embodiments disclosed herein related to software defined networking across several physical sites.

BACKGROUND

Priority Flow Control (PFC) is a link-level flow control mechanism that provides the ability to pause traffic of a select class in the event of a potential buffer overflow at a network switch. Several protocols use PFC, including Fiber Channel over Ethernet (FCoE) and Remote Direct Memory Access (RDMA) over Converged Ethernet (RoCE).

Traffic that is subjected to PFC is considered to be no-drop traffic to achieve a lossless network for PFC traffic. As a result, deadlocks are possible when using PFC if there is a cyclic buffer dependency among a set of network switches where each switch in the cycle holds all of the buffered data needed by an upstream switch while waiting for a downstream switch to release some of the associated downstream buffer space to resume packet transmission. Because none of the network switches can drop the PFC traffic which fill the buffer, and all of the network switches need to have a target network switch with available buffer space to free up space in the local buffer space by transferring the PFC traffic filling the local bugger, the network may cease transmitting traffic; resulting in deadlock.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
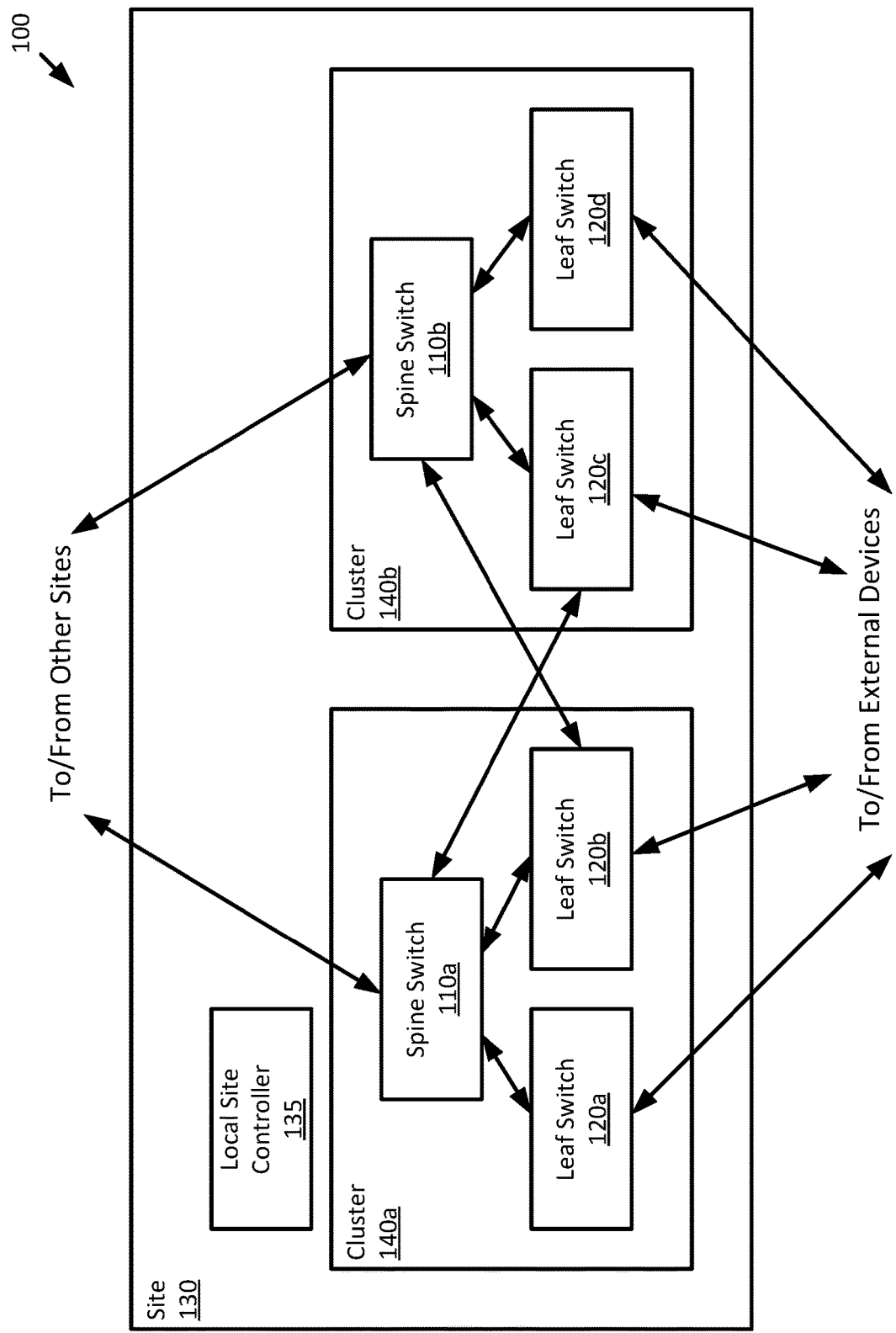
FIG. 1 illustrates a network topology, according to embodiments of the present disclosure.

One embodiment presented in this disclosure provides a method for mitigating priority flow control deadlock in stretch topologies is provided, the method comprising: initializing a plurality of queues in a buffer of a leaf switch at a local cluster of a site in a network fabric including a plurality of clusters, wherein each queue of the plurality of queues corresponds to a respective one cluster of the plurality of clusters; receiving a pause command for no-drop traffic on the leaf switch, the pause command including an internal Class-of-Service (iCoS) identifier associated with a particular cluster of the plurality of cluster and a corresponding queue in the plurality of queues; and in response to determining, based on the iCoS identifier, that the pause command was received from a remote spine switch associated with a different cluster than the local cluster: forwarding the pause command to a local spine switch in the local cluster; and implementing the pause command on the corresponding queue in the buffer.

One embodiment presented in this disclosure provides a non-transitory computer readable storage device including instructions that, where executed by a processor, enable the processor to perform an operation, the operation, comprising: initializing a plurality of queues in a buffer of a leaf switch at a local cluster of a site in a network fabric including a plurality of clusters, wherein each queue of the plurality of queues corresponds to a respective one cluster of the plurality of clusters; receiving a pause command for no-drop traffic on the leaf switch, the pause command including an internal Class-of-Service (iCoS) identifier associated with a particular cluster of the plurality of clusters and a corresponding queue in the plurality of queues; and in response to determining that the iCoS identifier is associated with a different cluster than the local cluster: forwarding the pause command to a local spine switch in the local cluster; and implementing the pause command on the corresponding queue in the buffer.

One embodiment presented in this disclosure provides a network switch, comprising: a processor; and a memory, including a buffer and instructions that when executed by the processor enable the network switch to: initialize a plurality of queues in the buffer, wherein each queue of the plurality of queues corresponds to a respective one cluster of a plurality of clusters in a site of a network fabric in which the network switch is deployed; receive a pause command for no-drop traffic, the pause command including an internal Class-of-Service (iCoS) identifier associated with a particular cluster of the plurality of clusters and a corresponding queue in the plurality of queues; in response to determining that the iCoS identifier is associated with a local cluster to which the network switch is deployed: implementing the pause command on the corresponding queue in the buffer; and in response to determining that the iCoS identifier is associated with a different cluster than the local cluster: forwarding the pause command to a local spine switch in the local cluster; and implementing the pause command on the corresponding queue in the buffer.

EXAMPLE EMBODIMENTS

To prevent Priority Flow Control (PFC) deadlock, the present disclosure enables the breaking of cyclic buffer dependencies to mitigate/avoid the conditions that lead to potential PFC deadlocks. By re-classifying and re-queuing no-drop traffic originating from physically separate locations in different no-drop traffic classes, the cyclic deadlock can be avoided. Avoiding deadlock according to the present disclosure improves the reliability of the network, and enables the deployment of PFCs in network architectures that were previously vulnerable to deadlock.

FIG. 1 illustrates a network topology 100, according to embodiments of the present disclosure. The illustrated topology 100 is of one site 130 in a Software Defined Network (SDN) using a stretch topology, in which two or more remote clusters 140 (individually, first cluster 140a and second cluster 140b) are communicated together to form a single site 130 within the SDN framework. The site 130 includes various spine switches 110 and leaf switches 120 that are logically divided into two distinct clusters 140 based on the communications paths between the equipment, which may be the result of communication pathway availability affecting the connections between the elements of a site 130. Although illustrated with a defined number of elements in the site 140, the present disclosure may be employed in topologies 100 that include various numbers of sites 130 with various numbers of spine switches 110, leaf switches 120, and clusters 140 thereof. The spine switches 110 and the leaf switches 120 are specialized computer networking devices for routing data within a network. Example hardware that may be used in a spine switch 110 or leaf switch 120 is discussed in relation to FIG. 5.

Each site 130 includes a respective local-site controller 135 to control the associated site 130, and in embodiments using multiple sites 130, the network fabric to which the sites 130 belongs includes a multi-site controller (not illustrated) to manage the several sites 130 in the network fabric. The multi-site controller and local-site controllers 135 can be implemented using software, hardware, or combinations thereof. The multi-site controller communicates with the local-site controllers 135 in each of the sites 130. The multi-site controller can use the local-site controllers 135 to identify the namespaces for the sites 130, establish secure connections between the sites 130, and the like. For example, the multi-site controller may configure the network switches in both of the sites 130 to operate as a single distributed network (e.g., with consistent Internet Protocol (IP) addresses) and to establish Virtual Private Networks (VPNs) between the sites 130.

In one embodiment, each cluster 140 contains several networking elements, which include at least one spine switch 110 (individually, first spine switch 110a and second spine switch 110b) connected to several leaf switches 120 (individually, first through fourth leaf switches 120a-d) in a two-stage Clos topology (one stage of leaf switches 120 and one stage of spine switches 110). In a Clos topology, leaf switches 120 (also referred to as Top-of-Rack (ToR) switches) send and receive communications with external devices, including various client computing devices and virtual machines, routers (in communication with devices outside of the network), firewalls, load balancing appliances, etc. The leaf switches 120 route communication flows through the spine switches 110, and the spine switches 110 route communication flows through the leaf switches 120. Stated differently, in one embodiment, the spine switches 110 are not in direct communication with other spines switches 110 and the leaf switches 120 are not in direct communication with other leaf switches 120.

The clusters 140 belong to the same site 130, but have elements that are located in different locations from one another, and that do not form connections for every element in one level of the topology with every element in another level of the topology. The distance between two clusters 140 in a site may vary in different embodiments, as may the number of clusters 140. As illustrated, the spine switches 110 and leaf switches 120 of the site 130 do not form an ideal Clos topology, but rather a stretched Clos topology; the first leaf switch 120a is not in direct communication with the second spine switch 110b, and the fourth leaf switch 120d is not in direct communication with the first spine switch 110a. A stretch topology may use designated leaf switches 120 as edge switches for cross-cluster communication flows to reduce the number of wires/cables/radio channels used to communicate between two clusters 140 in which the elements of those clusters 140 are remotely located from one another. Although using a reduced number of communication channels between distinct clusters 140 may reduce installation and maintenance needs, the connection(s) between the clusters 140 are bottlenecked, which may violate up-down routing rules and introduce a cyclic dependency between the two bottlenecked clusters 140.

In a Clos topology, each leaf switch 120 within a particular site 130 is in communication with each spine switch 110 in that particular site 130, thus allowing for a communication flow within one cluster 130 to travel from one leaf switch 120 to another leaf switch 120 with a single hop. For example, a communication flow through a first leaf switch 120a and a second leaf switch 120b uses one hop to pass through a first spine switch 110a. In contrast, communication flows passing between clusters 140 in a stretch topology may require up to two hops to reach a destination, as the site 130 uses designated leaf switches 120 for routing communication flows between clusters 140. For example, a communication flow from a first leaf switch 120a in the first cluster 140a to a second leaf switch 120 in the second cluster 140b may be transmitted from the first leaf switch 120 to a first spine switch 110a in the first cluster 140a, then to a third leaf switch 120 in the first cluster 140a as an edge switch for the first cluster 140a, then to a second spine switch 110 in the second cluster 140b, and then to the second leaf switch 110.

In some embodiments, a stretch topology is intentionally created to allow portions of a site 130 to be located at a separate location from other portions with lower physical overhead. For example, instead of running X+Y cables between an original networking room and an auxiliary networking room that link the X leaf switches 120 in the original room to all of the spine switches 110 in the auxiliary room and that link the Y lead switches 120 in the auxiliary room to all of the spine switches 110 in the original room, a network administrator may instead run two cables; linking edge leaf switches 120 to the spine switches 110 in the other room. In other embodiments, hardware or software (e.g., device resets, loose cables) downtime may unintentionally create a stretch topology. A stretch topology allows for cross-cluster communication with less physical overhead, but may leave the site 130 vulnerable to deadlock if the buffers in the network devices fill.

Figure 2:
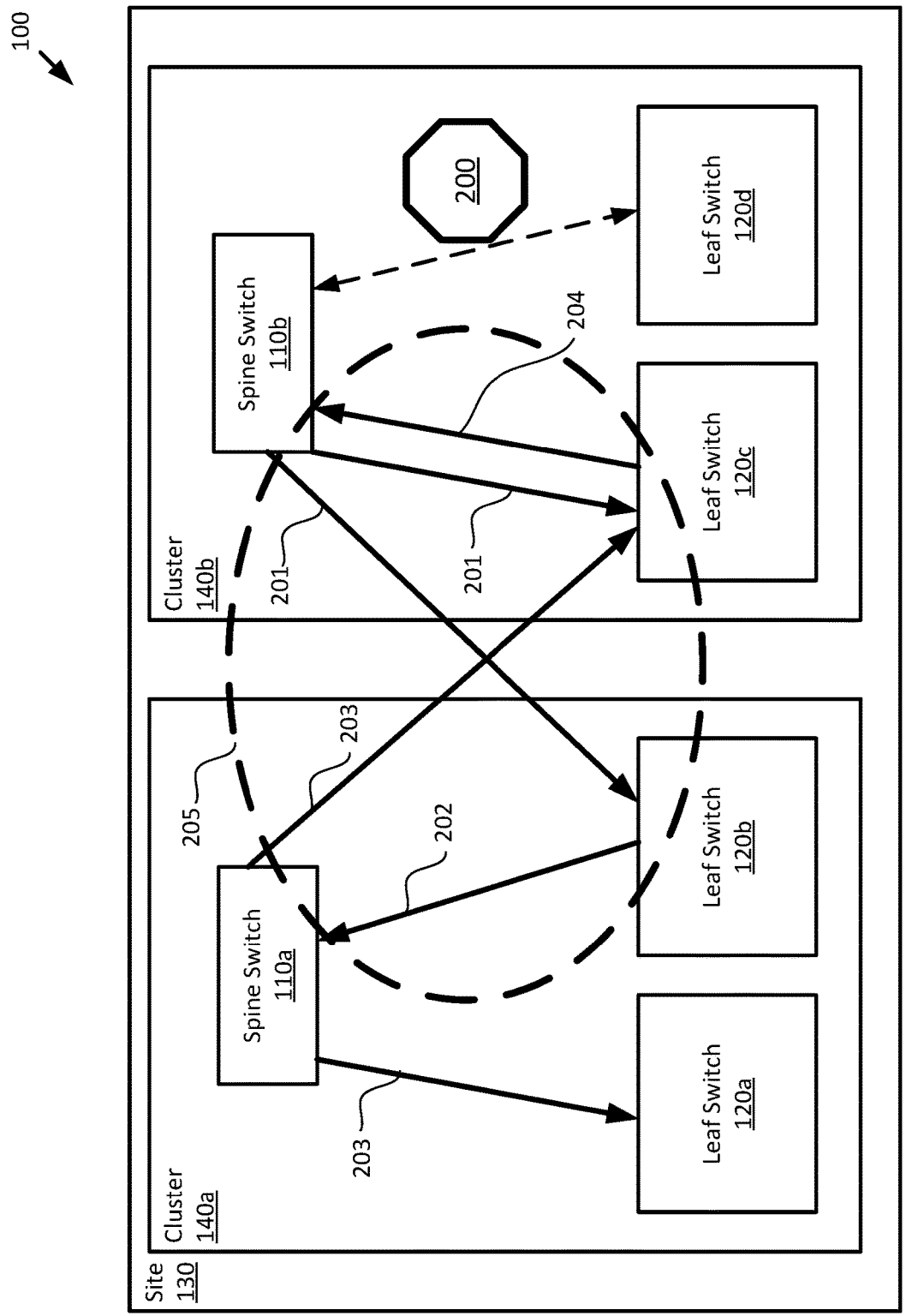
FIG. 2 illustrates the network topology of FIG. 1 in which the cyclic dependency results in a deadlock.

FIG. 2 illustrates the network topology 100 of FIG. 1 in which the cyclic dependency results in a deadlock. In the illustrated topology 100, the second spine switch 110b has identified a congestion event 200 on the fourth leaf switch 120d, and communicates a pause command in transmission 201 to the other leaf switches 120 in communication with second spine switch 110b (i.e., the a second leaf switch 120b and a third leaf switch 120c in the illustrated example). In an embodiment with more leaf switches 120 than the illustrated embodiment, the second spine switch 110b transmits the pause command to the other leaf switches 120 as well to signal those leaf switches 120 to avoid routing messages through the congested pathway.

The pause command causes the receiving leaf switches 120 to hold communication flows from being sent to the leaf switch 120 indicated as experiencing congestion—e.g., leaf switch 120d in this example. The pause command may specify various quanta of time that a commanded leaf switch 120 is to cache communications flows in a buffer instead of forwarding the communication flows to a spine switch 110 and the target leaf switch 120. If the specified quantum of time is long enough and the traffic volume is high enough, the buffer of the leaf switch 120 may be filled. If the data filling the buffer are marked as no-drop, the buffer remains filled until the destination device signals that the messages in the buffer are ready for reception.

In the illustrated topology 100 in FIG. 2, because the second leaf switch 120b is the designated leaf switch 120 linking the second spine switch 110b to the first cluster 140a, the second leaf switch 120b communicates the pause command in a second transmission 202 to the first spine switch 110a to distribute to the other leaf switches 120 in the first cluster 140a. The first spine switch 110a transmits a third transmission 203 that includes the pause command to the other leaf switches 120 in communication with first spine switch 110a (i.e., the a second leaf switch 120b and a third leaf switch 120c in the illustrated example).

The illustrated transmissions 201, 202, 203, and 204 form a loop 205 among second spine switch 110b, second leaf switch 120b, first spine switch 110a, and third leaf switch 120c. As data fill the buffers of the switches, the downstream switches for each switch in the loop 205 lose the ability to receive additional data due to lack of buffer space, thus causing upstream switches to cache data in respective buffers until the original switch that began buffering has no available destination switch to clear the respective buffer to, thus resulting in a deadlock that prevents the transmission of data.

Figure 3A:
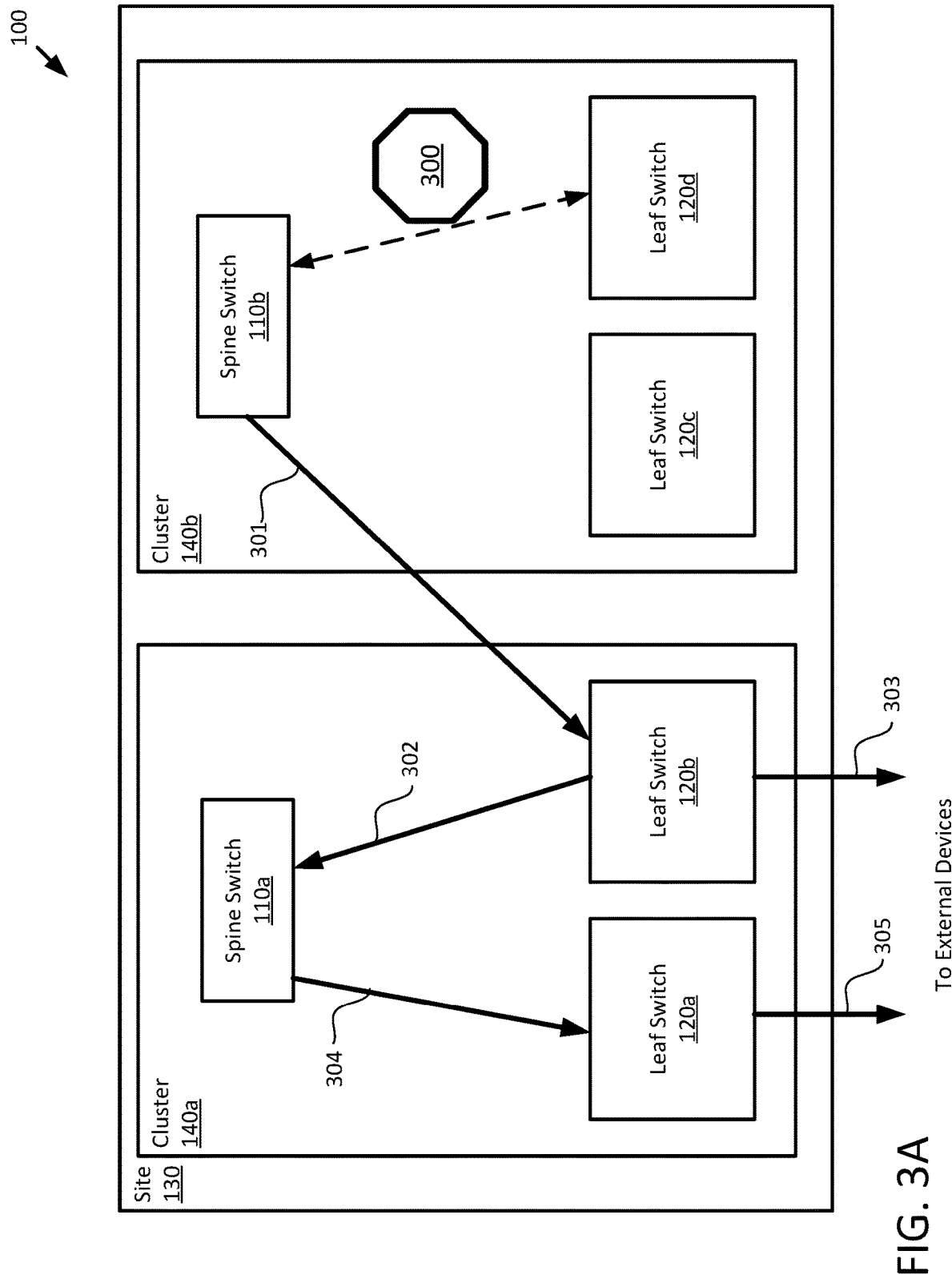
FIGS. 3A and 3B illustrates the network topology of FIG. 1 in which the cyclic dependency is avoided, according to embodiments of the present disclosure.
Figure 3B:
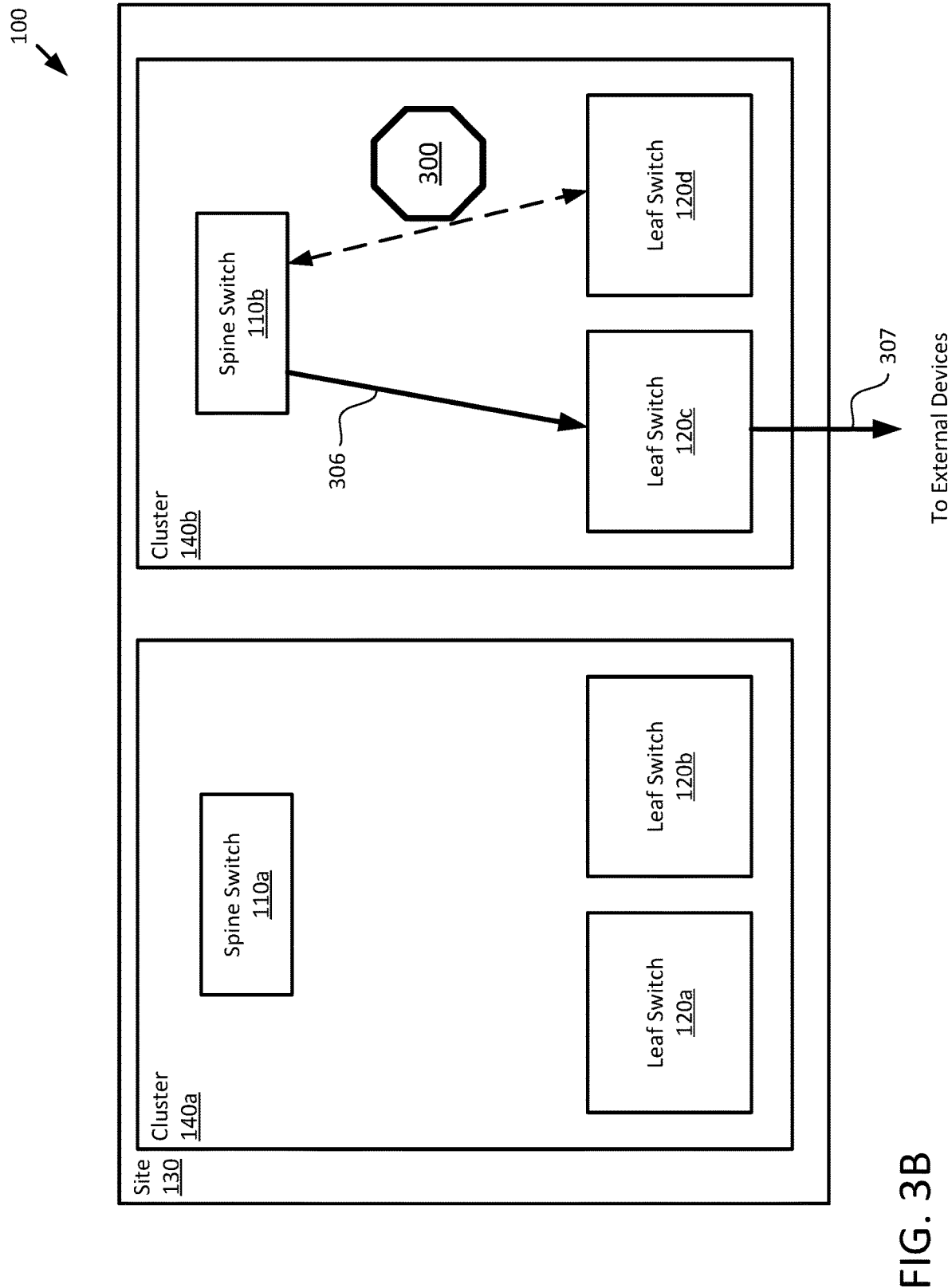
Figure 4:
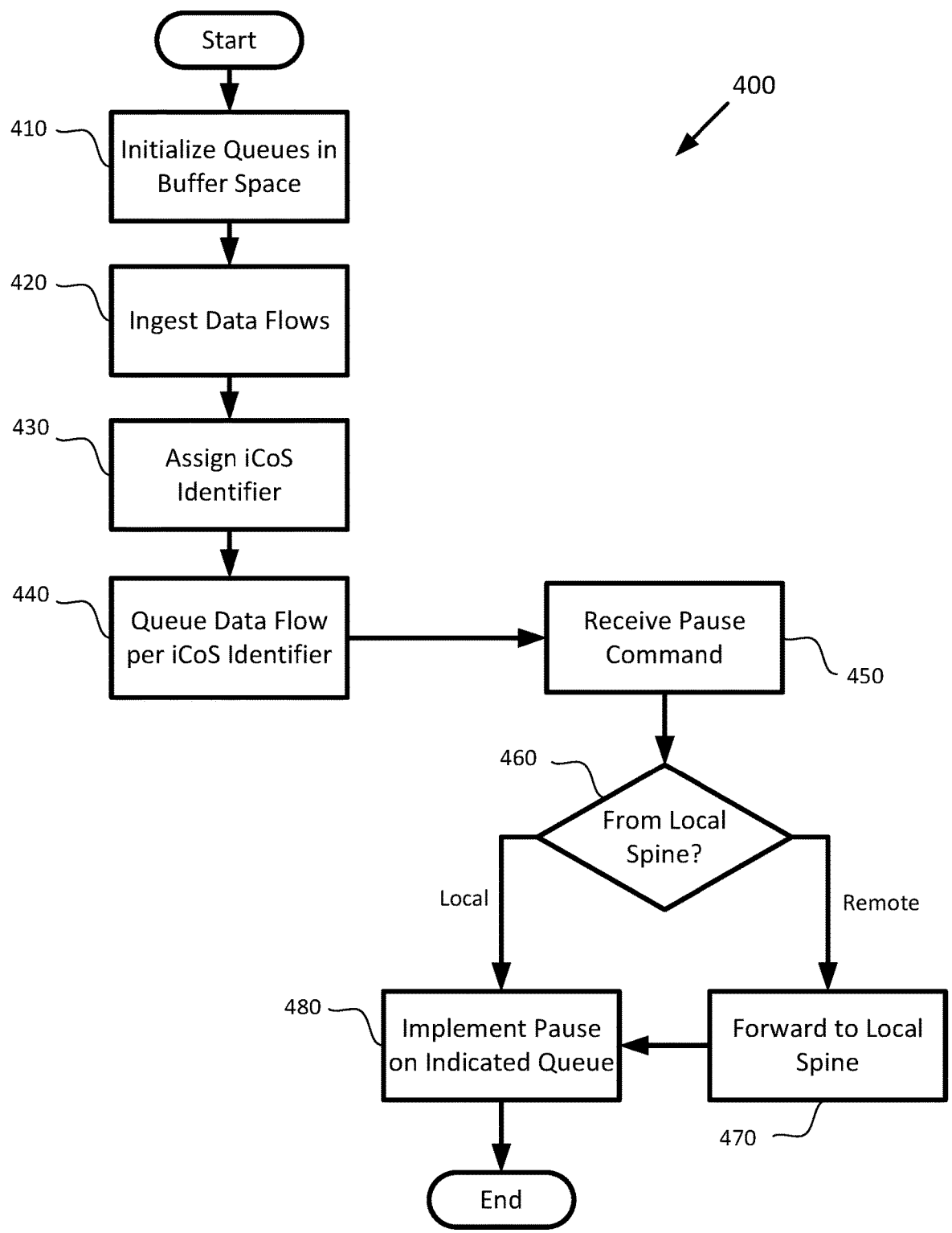
FIG. 4 is a flowchart for a method for preventing priority flow control deadlock in stretch topologies, according to embodiments of the present disclosure.

FIGS. 3A and 3B illustrate the network topology 100 of FIG. 1 in which the cyclic dependency is avoided, according to embodiments of the present disclosure. FIGS. 3A and 3B may be understood in combination with method 400 illustrated as a flowchart in FIG. 4. During setup of the site 130, a local-site controller 135 identifies the number of clusters 140 in the topology 100. In some embodiments, the network devices transmit identifiers to the local-site controller 135 to identify which other devices are reachable via a single hop. Using the identified number of clusters 140, the local-site controller 135 initializes the leaf switches 120 (per block 410) to have a number distinct queues in the available buffer space of the individual leaf switches 120 equal to or greater than the number of clusters 140 in the topology 100.

After initialization, as the leaf switches 120 ingest flows of traffic from external devices, the leaf switches 120 read the Class of Service (CoS) identifier of the flows to determine which flows are designated as no-drop traffic (per block 420). The leaf switches 120 assign an internal CoS (iCoS) identifier to the flows for tracking within the network fabric (per block 430). The number of iCoS identifiers available corresponds to the number of clusters 140 in the site 130. In some embodiments, the iCoS identifier assigned to the flow replaces the CoS identifier, and the CoS identifier is moved to another packet field in the flow (e.g., the Differentiated Service Code Point (DSCP) field) for later recovery. The iCoS identifier assigned to the flow is based on the origin cluster 140. In this way, a leaf switch 120 assigns the iCoS identifier to the flow such that flows passing from one cluster 140 to another cluster 140 may be differentiated from flows originating and staying within a single cluster 140.

For example, leaf switches 120 in a first cluster 140a assign an iCoS identifier associated with the first cluster 140a to all flows received by those leaf switches 120 from external devices, while leaf switches 120 in a second cluster 140b assign an iCoS identifier associated with the second cluster 140b to all flows received by those leaf switches 120 from external devices. In this way, a leaf switch 120 that receives a flow from a spine switch 110 can identify the origin of the flow by using the iCoS identifier, and thereby place the flow in a queue uniquely associated with that iCoS identifier (per block 440).

When a spine switch 110 generates a pause command in the site 130, the spine switch 110 identifies which queue is congested on the affected switch and includes the iCoS identifier associated with that queue in the pause command. The switches that receive the pause command identify which queue locally maintained on the switch is affected by congestion on the other switch, so that the switches do not transfer data buffered in the particular queue, which would be dropped by the affected switch if transmitted. In the illustrated topology 100, the second spine switch 110b identifies a congestion event 300 on the fourth leaf switch 120d, and determines where to communicate a pause command in the site 130 based on the iCoS identifier whose queue is affected.

In the illustrated example of FIG. 3A, where the congestion event 300 is discovered in the second cluster 140b, but affects the queue associated with the first site 140a, the second spine switch 110b sends the transmission 301 to the second leaf switch 120b (which is received per block 450) to communicate the pause command to the cluster 140 responsible for the flows affected by the congestion event 300. Other leaf switches 120 (e.g., in the affected cluster 140 or another cluster 140 other than the source cluster 140 for the affect flow) are not transmitted the pause command.

The leaf switch 120 at the edge of a cluster 140 from which the affected flow originates receives the transmission 301 (per block 450) from the generating spine switch 110 and determines (per block 460) how to handle the pause command. In the example illustrated in FIG. 3A, the second leaf switch 120b receives the pause command from outside of the associated first cluster 140a from the second spine switch 110b in the remote second cluster 140b, and forwards the pause command to a local spine node 110 within the first cluster 140a (per block 470). In the example illustrated in FIG. 3A, the second leaf switch 120b in the first cluster 140a receives and forwards the pause command to the first spine switch 110a via transmission 302.

When a spine switch 110 receives a pause command related to the local cluster 110 from an edge leaf switch 120, the spine switch 110 forwards the pause command to the other leaf switches 120 in the local cluster 140. The leaf switches 120 in this case determine (per block 460) to implement the pause command on the indicated queue (per block 480). In the illustrated example in FIG. 3A, the first spine switch 110a, via transmission 304, forwards the pause command to the other leaf switches 120 (e.g. first leaf switch 120a, having already received the pause command from the second leaf switch 120b) in the local first cluster 140a.

When a spine switch 110 determines that the congestion event 300 affects the queue associated with the local site 140 to which the spine switch 110 belongs, a spine switch 110 generates a pause command for transmission locally to the cluster 140. In the illustrated example in FIG. 3B, the second spine switch 110b transmits the pause command to the other leaf switches 120 in the local second cluster 140b via transmission 306 (e.g., third leaf switch 120c, as the fourth spine switch 110d has already been identified as being affected by the congestion event 300). Because the leaf switches 120 in the site(s) 140 remote from the spine switch 110 do not originate flows using the iCoS identifier of the affected queue, the spine switch 110 or leaf switches 120 do not forward the pause command outside of the site 140.

When a leaf switch 120 receives a pause command, whether locally or remotely generated, the leaf switch 120 implements the pause command on the queue associated with the iCoS identifier included in the pause command (per block 480). Data held in the paused queue is buffered until the pause command expires (or is otherwise cancelled), but the leaf switch 120 continues to buffer or transmit the data in the other queues to the respective destinations for those flows. Stated differently, the leaf switches 120 implement the pause command on the queue associated with that iCoS identifier, but not the other queues.

The leaf switch 120 also transmits the pause command in transmission 303/305/307 to any external devices that may be affected by the congestion event. When transmitting data in a flow to an external device, whether a pause command or other data, the leaf switch 120 replaces the iCoS identifier used internally by the site 130 with the original CoS identifier used in the flow (as per block 430). In various embodiments, the leaf switch 120 uses a lookup table to correlates one CoS identifier to several iCoS identifiers, while in other embodiments, the leaf switch 120 reads the CoS identifier to substitute for the iCoS identifier from a packet field in the flow (e.g., a DSCP

FIELD

In this way, the switches in the network fabric 130 manage flows and potential congestion without the potential of a deadlock, as no-drop traffic are prevented from being queued together in a cyclic buffer pattern.

Figure 5:
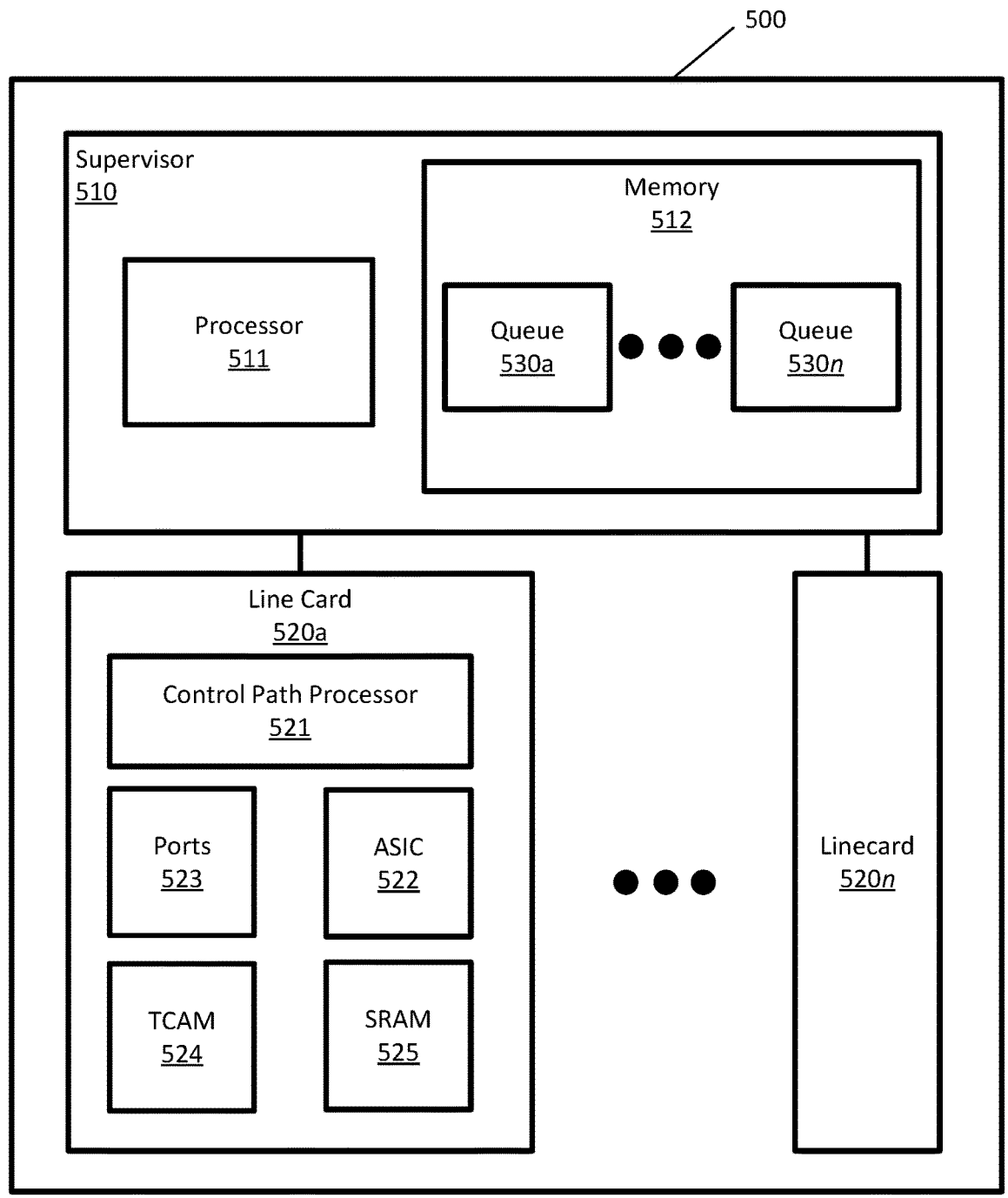
FIG. 5 illustrates hardware of a network switch, according to embodiments of the present disclosure.

FIG. 5 illustrates hardware of a network switch 500, as may be used as one of a spine switch 110 or a leaf switch 120 according to embodiments of the present disclosure. The network switch 500 includes a supervisor module 510 and a plurality of linecards 520a-n. The supervisor module 510 includes a processor 511 and memory 512. The memory 512 stores software instructions that are executed by the processor 511. In particular, the memory 512 stores instructions for routing data to other devices (e.g., external devices or other network switches 500 in the network fabric 130) according to the present disclosure so as to avoid cyclic loops and the associated deadlocks.

Each linecard 520 includes a control path processor 521, an Application Specific Integrated Circuit (ASIC) 522, a plurality of ports/interfaces 523 coupled to the ASIC 522, a Ternary Content-Addressable Memory (TCAM) 524, and a Static Random Access Memory (SRAM) 525. The control path processor 521 is a CPU/processor that receives configuration commands from the supervisor module 510 to program the TCAM 524 and SRAM 525. The ASIC 522 is a hardware device that directs an incoming packet at a port/interface 523 to a particular other port/interface on another device based on the content of the TCAM 524 and SRAM 525. The ASIC 522 may buffer received packets in the TCAM/SRAM for delayed transmission to the other device. There may be multiple TCAM/SRAM pairs in a linecard 520.

The network switch 500 maintains a plurality of queues 530a-n in the memory 512 (or the TCAM/SRAM in a linecard 520) that provides buffering for the network switch 500. The number of queues 530 is at least equal to the number of clusters 140 in the site 130, and each queue holds data flows for data flow of a single iCoS that corresponds to a given cluster 140 in the network fabric 130. Each queue 530 may be defined as the same amount of memory space as the other queues 530 in the plurality, or different queues 530 may be defined to include more or less memory space than the other queues 530.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   initializing a plurality of queues in a buffer of a leaf switch at a local cluster of a site in a network fabric including a plurality of clusters, wherein each queue of the plurality of queues corresponds to a respective one cluster of the plurality of clusters;
   receiving a pause command for no-drop traffic on the leaf switch, the pause command including an internal Class-of-Service (iCoS) identifier associated with a particular cluster of the plurality of clusters and a corresponding queue in the plurality of queues; and
   in response to determining, based on the iCoS identifier, that the pause command was received from a remote spine switch associated with a different cluster than the local cluster:
      forwarding the pause command to a local spine switch in the local cluster; and
      implementing the pause command on the corresponding queue in the buffer.

2. The method of claim 1, further comprising:
   receiving a second pause command for no-drop traffic on the leaf switch, the second pause command including a second iCoS identifier associated with a given cluster of the plurality of clusters and a second corresponding queue in the plurality of queues; and
   in response to determining, based on the second iCoS identifier, that the second pause command was received from a local spine switch associated with the local cluster: implementing the second pause command on the second corresponding queue in the buffer.

3. The method of claim 1, wherein implementing the pause command further comprises:
   caching and not transmitting data flows in the corresponding queue in the buffer for a predetermined quantum of time; and
   continuing transmitting other data flows in other queues initialized in the buffer.

4. The method of claim 1, wherein implementing the pause command further comprises:
   replacing the iCoS identifier with a Class-of-Service (CoS) identifier; and
   transmitting the pause command to an external device in communication with the leaf switch, including the CoS identifier.

5. The method of claim 1, wherein the leaf switch, in response to receiving a data flow from an external device, replaces a Class-of-Service (CoS) identifier with a iCoS identifier associated with the local cluster and places the data flow into the corresponding queue in the buffer.

6. The method of claim 1, wherein the pause command is generated by the local spine switch in response to detecting a congestion event affecting data flows held in the corresponding queue on a second leaf switch at the local cluster and is transmitted to other leaf switches in the local cluster.

7. The method of claim 1, wherein the pause command is received by the local spine switch from an edge leaf switch in the local cluster in communication with a second spine switch in the different cluster and is transmitted to other leaf switches in the local cluster.

8. A non-transitory computer readable storage device including instructions that, where executed by a processor, enable the processor to perform an operation, the operation, comprising:
   initializing a plurality of queues in a buffer of a leaf switch at a local cluster of a site in a network fabric including a plurality of clusters, wherein each queue of the plurality of queues corresponds to a respective one cluster of the plurality of clusters;
   receiving a pause command for no-drop traffic on the leaf switch, the pause command including an internal Class-of-Service (iCoS) identifier associated with a particular cluster of the plurality of clusters and a corresponding queue in the plurality of queues; and
   in response to determining that the iCoS identifier is associated with a different cluster than the local cluster:
      forwarding the pause command to a local spine switch in the local cluster; and
      implementing the pause command on the corresponding queue in the buffer.

9. The non-transitory computer readable storage device of claim 8, wherein the operation further comprises:
   receiving a second pause command for no-drop traffic on the leaf switch, the second pause command including a second iCoS identifier associated with a given cluster of the plurality of clusters and a second corresponding queue in the plurality of queues; and
   in response to determining, based on the second iCoS identifier, that the second pause command was received from a local spine switch associated with the local cluster, implementing the second pause command on the second corresponding queue in the buffer.

10. The non-transitory computer readable storage device of claim 8, wherein implementing the pause command further comprises:
   caching and not transmitting data flows in the corresponding queue in the buffer for a predetermined quantum of time; and continuing transmitting other data flows in other queues initialized in the buffer.

11. The non-transitory computer readable storage device of claim 8, wherein implementing the pause command further comprises:
    replacing the iCoS identifier with a Class-of-Service (CoS) identifier; and
    transmitting the pause command to an external device in communication with the local switch, including the CoS identifier.

12. The non-transitory computer readable storage device of claim 8, wherein the leaf switch, in response to receiving a data flow from an external device, replaces a Class-of-Service (CoS) identifier with a particular iCoS associated with the local cluster and places the data flow into the corresponding queue in the buffer.

13. The non-transitory computer readable storage device of claim 8, wherein the pause command is generated by the local spine switch in response to detecting a congestion event affecting data flows held in the corresponding queue on a second leaf switch at the local cluster and is transmitted to other leaf switches in the local cluster.

14. The non-transitory computer readable storage device of claim 8, wherein the pause command is received by the local spine switch from an edge leaf switch in the local cluster in communication with a second spine node in the different cluster and is transmitted to other leaf switches in the local cluster.

15. A network switch, comprising:
    a processor; and
    a memory, including a buffer and instructions that when executed by the processor enable the network switch to:
        initialize a plurality of queues in the buffer, wherein each queue of the plurality of queues corresponds to a respective one cluster of a plurality of clusters in a site of a network fabric in which the network switch is deployed;
        receive a pause command for no-drop traffic, the pause command including an internal Class-of-Service (iCoS) identifier associated with a particular cluster of the plurality of clusters and a corresponding queue in the plurality of queues;
        in response to determining that the iCoS identifier is associated with a local cluster to which the network switch is deployed:
            implementing the pause command on the corresponding queue in the buffer; and
        in response to determining that the iCoS identifier is associated with a different cluster than the local cluster:
            forwarding the pause command to a local spine switch in the local cluster; and
            implementing the pause command on the corresponding queue in the buffer.

16. The network switch of claim 15, wherein to implement the pause command, the network switch is further enabled to:
    cache and not transmit data flows in the corresponding queue in the buffer for a predetermined quantum of time; and
    continue to transmit other data flows cached in other queues initialized in the buffer.

17. The network switch of claim 15, wherein to implement the pause command, the network switch is further enabled to:
    replace the iCoS identifier with a Class-of-Service (CoS) identifier; and
    transmit the pause command to an external device in communication with the network switch, including the CoS identifier.

18. The network switch of claim 15, wherein, in response to receiving a data flow from an external device, the network switch is further enabled to:
    replace a Class-of-Service (CoS) identifier with a iCoS associated with the local cluster; and
    place the data flow into the corresponding queue in the buffer.

19. The network switch of claim 15, wherein the pause command is generated by the local spine switch in response to detecting a congestion event affecting data flows held in the corresponding queue on a second leaf switch at the local cluster and is transmitted to other leaf switches in the local cluster.

20. The network switch of claim 15, wherein the pause command is received by the local spine switch from an edge switch in the local cluster in communication with a second spine switch in the different cluster and is transmitted to other leaf switches in the local cluster.

* * * * *